Sept. 9, 1969  C. MAHIEU ETAL  3,466,238
ELECTROLYTIC REFERENCE CELL
Filed Oct. 27, 1966
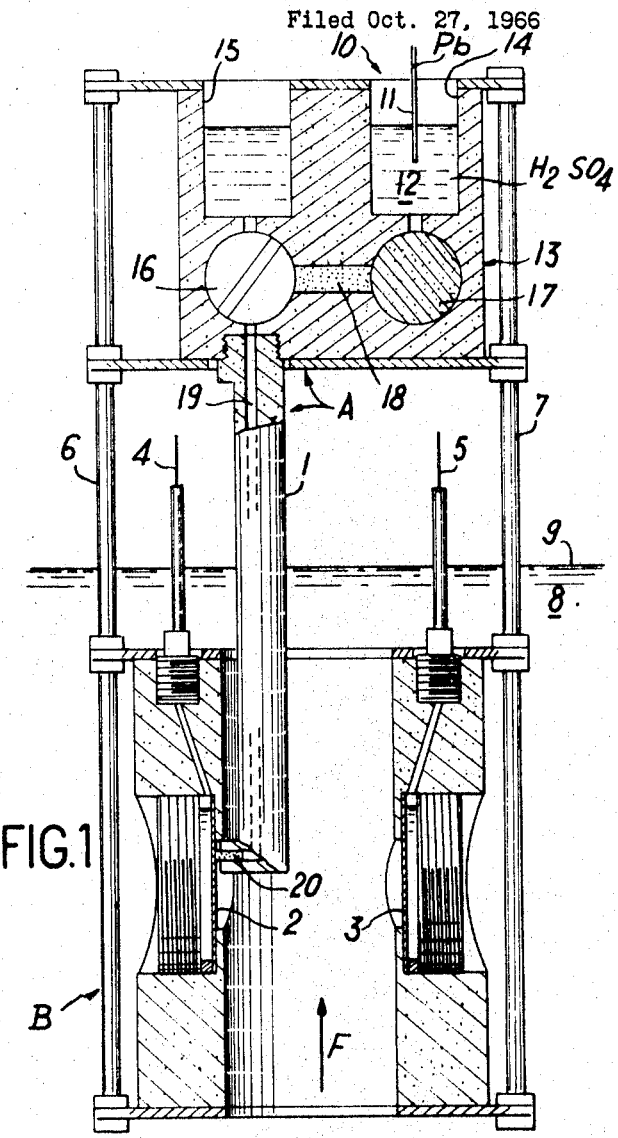
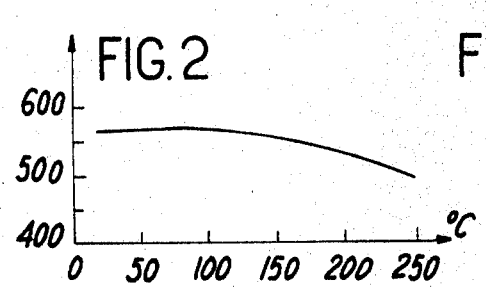
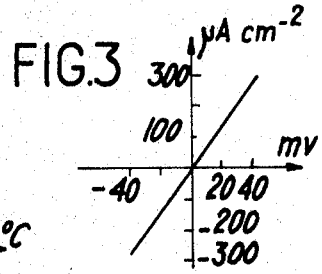

United States Patent Office 3,466,238
Patented Sept. 9, 1969

3,466,238
ELECTROLYTIC REFERENCE CELL
Claude Mahieu and Marcel Le Peintre, Paris, and Jacques Monjou, La Courneuve, France, assignors to Commissariat a l'Energie Atomique, Paris, France
Filed Oct. 27, 1966, Ser. No. 589,910
Claims priority, application France, Apr. 7, 1966, 56,920
Int. Cl. B01k 3/00
U.S. Cl. 204—195                                    10 Claims

ABSTRACT OF THE DISCLOSURE

An electrolytic reference cell for the study of electrochemical properties of metals at temperatures above 300° C. has a reference electrode of lead in sulfuric acid solution. The electrode is in a block of thermally and chemically resisting material. A tubular element is mounted at one end in the block and passes through a first porous element to bear on the metal sample which acts as the second electrode. The tubular element contains an electrolytic solution. A second porous element is interposed between the electrolytic solution and the sulfuric acid solution.

---

The present invention relates to an electrolytic reference cell to be used in aqueous media at temperatures of 300° C. or above and intended for the study of the electro-chemical properties of all metals in electrolytes at high temperatures and, in particular, to the study of the aqueous corrosion of various metal alloys at high temperatures by means of current-voltage curves.

As is well known, the conventional methods for the electro-chemical study of corrosion make use of a so-called reference electrode; when the alloys concerned are at high temperatures, e.g., of about 250° C., said reference electrode must be able to work efficiently up to such a high temperature and under a high hydrogen pressure.

Now, the conventional Ag, AgCl- reference electrode contained in borosilicate-containing glasses is not suitable, since the presence of $Cl^-$ and $SiO_3^{--}$ ions in the solution is likely to disturb the phenomena under study; an Ag, $AgSO_4^-$ reference electrode might be used up to a little under 150° C. but, unfortunately, as soon as the temperature of 150° C. is reached and under a high hydrogen pressure, silver sulphate is reduced to the condition of metallic silver. Therefore, said electrode can no longer be used; now, the applicant has ascertained that the Pb, $PbSO_4^-$ reference electrode, which had already been used up to 60° C., could also be efficiently used up to a temperature of at least 250° C., provided it is associated with a cell made of a material capable of thermally and chemically resisting the operating conditions. The present invention relates to such a Pb, $PbSO_4$ reference electrode.

More precisely, the present invention relates to an electrolytic reference cell to be used in an aqueous medium, at temperatures which can exceed 300° C. and adapted to the study of the electro-chemical properties of all metals in electrolytes at a high temperature, said reference cell comprising a reference electrode made of a lead (Pb) element dipped into a sulfuric acid solution, said electrode being located in a block made of a material capable of thermally and chemically resisting alkaline and acid solutions at such high temperatures, and a tubular element, said tubular element being fixed, by one of its ends, to said block and adapted to be applied at its other end, through a so-called first porous element, against a metal sample to be studied, said metal sample acting as a second electrode, said tubular element containing an electrolytic solution following the sulfuric acid solution into which the lead element is dipped, a so-called second porous element being interposed between said electrolytic solution and said sulfuric acid solution, said tubular element and said first and second porous elements being made of a material endowed with the same properties of thermal and chemical resistance as the material of said block.

In the case of temperatures not higher than 300° C., the material to be used can be Teflon (viz polytetrafluoroethylene) and the porous element is porous Teflon, whereas above 300° C., the material to be used is preferably a sintered substance, e.g., zircon stabilized with rare earths and, in particular, zircon, stabilized with yttrium oxide.

The reference cell according to the invention is preferably used jointly with an electrolytic cell, one electrode of which is constituted by a plate made of a metal whose electro-chemical properties at high temperatures are to be studied, said latter electrode constituting one end of an electrolytic series, the other end of which is the reference electrode of the reference cell.

Other features of the present invention will be given hereafter, reference being made to the accompanying drawing, wherein:

FIG. 1 is a cross section of the reference cell according to the invention mounted on an electrolytic cell and, FIGS. 2 and 3 are graphs concerning the study of the features of the reference electrode according to the invention.

The reference cell according to the present invention, and such as shown at A in FIG. 1, is mounted, by means of uprights 6 and 7 above an electrolytic cell B, and the duct 19 of its tubular element 1, which is filled with an electrolyte, is connected to a joint 20 of porous Teflon abutting against one of the electrodes (2) of cell B, said electrode being a metal plate which is the sample whose electro-chemical properties at high temperatures are to be studied (e.g., electro-chemical study of corrosion).

The second electrode of cell B is shown at 3; reference numerals 4 and 5 designate the current terminals of cell B. These terminals are coated with Teflon. Electrodes 2 and 3 are are dipped into a circulating (see arrow F) electrolytic solution, the free level of which is shown at 9 said solution, in which are measured the changes in the electro-chemical properties of sample 2 at a given temperature, can be an electrolyte of any type (either an acid, a base or a salt).

The reference cell (A) according to the present invention essentially comprises a reference electrode 10 consisting in a lead (Pb) element 11 dipped into a sulfuric acid solution 12 and located in a block 13, on one hand, and tubular element 1, on the other hand.

According to the present invention, said block 13 and tubular element 1 are made of a material capable of thermally and chemically resisting the electrolytic solutions, at a high temperature, forming the electrolytic series which ranges from lead (Pb) element 11 to the metal plate 2 to be studied.

With an operating temperature of, e.g., 250° C., the material to be used is preferably Teflon.

In addition to the jar 14 containing the sulfuric acid solution 12 a reference electrode 10, block 13 of the reference cell A comprises a second jar 15 for receiving an electrolytic solution, two Teflon cocks 16 and 17 (e.g., conical cock) and a porous element 18 (e.g., of porous Teflon) which connects these two plugs. Porous element 18 provides an electrical continuity and contributes to hinder an important migration of the ions. Accordingly, the ion concentration is substantially constant in each of jars 14 and 15.

Plug 17 can comprise a mobile part without opening (as shown in FIG. 1), the electrical continuity being then ensured by the liquid film which surrounds said mobile part.

The reference cell 1 according to the present invention is essentially intended to allow the study of the electrochemical properties, in an aqueous medium, of metal plate 2 at a high temperature (e.g., 250° C.), said plate 2 being for instance made of an alloy.

The study to be carried out is for instance that of the polarization curves of said plate 2.

According to the present invention, it is necessary for carrying out such a study to form an electrolytic series ranging from lead (Pb) element 11 to the plate 2 under study.

Such an electrolytic series is constituted by the serially-mounted following conductors:

Lead (Pb) element 11, sulfuric acid solution 12, porous element 10, tubular element 1 (the latter two elements being thermally and chemically resistant) and the metal plate 2 under study, which acts as a second electrode, porous element 18 and tubular element 1 being filled with an electrolytic solution which is not likely to give rise to too high junction voltages with $H_2SO_4$ (e.g., a solution of $SO_4K_2$, KCl or $KNO_3$).

By means of the reference cell A according to the present invention, it is made possible to study the electrochemical properties of metals in an aqueous medium and at a temperature which can exceed 300° C., with an excellent reliability. The outstanding qualities of said reference cell A at high temperatures, which the reference electrodes of the prior art (Ag, $AgSO_4$ electrode or Ag, AgCl electrode) do not possess, have been ascertained by the applicant following various experiments which will be explained hereafter. The tests were carried out with block 13 (i.e., cell A without the tubular element 1 thereof) such as shown in the upper portion of FIG. 1.

(a) Calibration of the reference cell. Block 13 is introduced into a stainless-steel autoclave provided with insulated passages for current made of glass welded to a tungsten rod; the insulation of said passages (in a damp atmosphere at 250° C.) with respect to the whole autoclave is between .8 and 1.2 megohm. A regulating device maintains the temperature of block 13 constant, with an allowance of not more than 2° C.; the voltage is measured by a recording millivoltmeter having a high input impedance.

Jar 14 is filled with a sulfuric acid solution 12 into which lead (Pb) element 11 is dipped (said parts forming features of the invention). One fills jar 15 with an hydrochloric acid solution into which is introduced an AgCl electrode (not shown in FIG. 1), after having mounted porous element 18 of Teflon, previously impregnated with a $K_2SO_4$ solution. Then, one studies the following electrolytic series: Ag, AgCl/HCl (0.1 m.)/$K_2SO_4$/$H_2SO_4$ (0.05 m.)/$PbSO_4$Pb; the potential at 250° C. of battery thus obtained is $E = +0.567 \pm 0.005$ v ($m$ designates the number of moles per kilo of the solution). The potentials measured at various temperatures are given by the following table and shown in FIG. 2:

| $t$ (° C.): | E (mv.) |
| --- | --- |
| 25 | +567 |
| 100 | +570 |
| 150 | +560 |
| 200 | +535 |
| 250 | +500±10 |

From these results, it is possible to achieve a calibration with respect to the hydrogen electrode.

(b) Stability test:

A single sulfuric acid solution (0.05 m.) maintained at 250° C. is used, and identical lead (Pb) electrodes are dipped into jar 14 and 15: the test carried out shows that these elements give a very small potential difference, of ±10 mv. at most.

(c) Reliability test:

With the same electrolytic series as in the above (a) test, the temperature is raised up to 250° C. then lowered down to the starting temperature. The test carried out shows that the potential of battery (I) is the same at the end of the test as at the beginning, with the small allowance of 10 mv. at most.

(d) Reversibility test:

In block 13 is formed the following electrolytic series: $H_2Pt/H_2SO_4$ (0.05 m.)/$PbSO_4$, Pb.

If an increasing electric current of up to 0.3 ma. cm.$^{-2}$ is caused to circulate for 5 minutes through the Pb, $PbSO_4$ electrode (which is a feature of the present invention), the test carried out shows that, once the electric current has been cut off, the balance between the two electrodes is restored within less than one minute; the results obtained are the same if the current is reversed.

FIG. 3 is indicative of the reversibility at 250° C. of the lead (Pb) electrode (which is a feature of the present invention).

(e) Polarization test:

The electrolytic series being the same as at (b), a potential difference of 200 mv. is applied for ten minutes between the two identical lead (Pb) electrodes, then it is cancelled.

The test carried out shows that the residual voltage quickly decreases and become nil after five minutes.

The above explained tests are indicative of the reliability at high temperatures, of the reference electrode of the cell according to the invention, and they show that said electrode is perfectly suitable for studying the electrochemical properties of metals in an aqueous medium at a high temperature. The non-polarizing electrode according to the invention is perfectly stable and reversible, which is of special interest for practical applications and, in particular, for the study of the aqueous corrosion of various alloys at temperatures which can exceed 300° C.

What is claimed is:

1. An electrolytic reference cell to be used in an aqueous medium at a temperature which can exceed 300° C. and adapted to the study of the electrochemical properties of all metals in electrolytes at a high temperature, said reference cell comprising a reference electrode made of a bare lead piece dipped into a sulfuric acid solution, said electrode being located in a block made of a material capable of thermally and chemically resisting alkaline and acid solutions at such high temperatures, and a tubular element, said tubular element being fixed, by one of its ends, to said block and applied at its other end through a first porous element, against a metal sample to be studied, said metal sample acting as a second electrode, said tubular element containing an electrolytic solution following the sulfuric acid solution into which the lead element is dipped, a second porous element being interposed between said electrolytic solution and sulfuric acid solution, said tubular element and said first and second porous elements being made of a material endowed with the same properties of thermal and chemical resistance as the material of said block.

2. An electrolytic reference cell according to claim 1, wherein, at temperatures not higher than 300° C., the said material is Teflon (polytetrafluoroethylene).

3. An electrolytic reference cell according to claim 1, wherein, said first and second elements are made of porous polytetrafluoroethylene.

4. An electrolytic reference cell according to claim 1, wherein, in the case of temperatures above 300° C., the said material is a sintered substance.

5. An electrolytic reference cell according to claim 4, wherein said sintered substance is stabilized with rare earths.

6. An electrolytic reference cell according to claim 5, wherein said sintered substance is zircon stabilized with yttrium oxide.

7. A reference cell according to claim 1, said cell being used jointly with an electrolytic cell, one electrode of which is constituted by a plate made of a metal whose electro-chemical properties at high temperatures are to be studied.

8. A reference cell according to claim 1, wherein a plug is interposed between said second porous element and said sulfuric acid solution into which said lead (Pb) element is dipped.

9. A reference cell according to claim 8, wherein said plug comprises a mobile part without opening.

10. A reference cell according to claim 1, wherein said second porous element is impregnated with a $K_2SO_4$ solution.

References Cited

UNITED STATES PATENTS

| | | | |
|---|---|---|---|
| 2,846,386 | 8/1958 | Ingruber | 204—195 |
| 2,930,967 | 3/1960 | Laird et al. | 204—195 |
| 3,073,758 | 1/1963 | Ladisch | 204—1.1 |
| 3,103,480 | 9/1963 | Watanabe et al. | 204—195 |
| 3,281,348 | 10/1966 | Schumacher et al. | 204—195 |

JOHN H. MACK, Primary Examiner

T. TUNG, Assistant Examiner